US006985591B2

(12) United States Patent
Graunke

(10) Patent No.: US 6,985,591 B2
(45) Date of Patent: Jan. 10, 2006

(54) METHOD AND APPARATUS FOR DISTRIBUTING KEYS FOR DECRYPTING AND RE-ENCRYPTING PUBLICLY DISTRIBUTED MEDIA

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 921 days.

(21) Appl. No.: 09/896,613

(22) Filed: Jun. 29, 2001

(65) Prior Publication Data

US 2003/0005285 A1 Jan. 2, 2003

(51) Int. Cl.
*H04L 9/00* (2006.01)
(52) U.S. Cl. .................................. 380/277; 713/156
(58) Field of Classification Search .............. 380/277, 380/200; 700/83; 713/156
See application file for complete search history.

(56) References Cited

U.S. PATENT DOCUMENTS

| 6,064,739 A * | 5/2000 | Davis .......................... 380/200 |
| 6,400,996 B1 * | 6/2002 | Hoffberg et al. .............. 700/83 |
| 6,904,522 B1 * | 6/2005 | Benardeau et al. ......... 713/156 |
| 2003/0108206 A1 * | 6/2003 | Diehl et al. ................. 380/277 |

* cited by examiner

*Primary Examiner*—Gilberto Barrón
*Assistant Examiner*—Ellen C Tran
(74) *Attorney, Agent, or Firm*—Blakely, Sokoloff, Taylor & Zafman LLP

(57) ABSTRACT

The present invention provides secure communication from one encryption domain to another using a trusted module. In one embodiment, the invention includes receiving a first key for decryption of encrypted content over a secure authenticated channel, receiving a second key for re-encrypting the encrypted content over a secure authenticated channel. The invention further includes receiving the encrypted content, decrypting and re-encrypting the encrypted content using the first key and the second key, and conveying the re-encrypted content to a sink.

24 Claims, 4 Drawing Sheets

METHOD AND APPARATUS FOR DISTRIBUTING KEYS FOR DECRYPTING AND RE-ENCRYPTING PUBLICLY DISTRIBUTED MEDIA

BACKGROUND OF THE INVENTION

1. Field of the Invention

The present invention relates generally to the field of secure transmission of content such as software and movies through public channels. More particularly, the invention relates to receiving encrypted content with a first encryption through a public channel and re-encrypting it for private use with a second encryption.

2. Description of the Related Art

Many different approaches have been taken to prevent unauthorized reproduction and distribution of content such as movies and videos, software and television programming. Most of these approaches have focused on one of two portions of vulnerability of the content. The first portion is the distribution media to the end customer. Cable and satellite broadcasters, for example, broadcast almost all programming with encryption. The keys to the encryption are sent to a set-top box which receives the encrypted broadcast, decrypts it, and forwards it on to playback or recording devices. Similarly, for software distributed over a public channel such as the Internet, the software is frequently encrypted in the transmission between the server and the client, then decrypted upon receipt by the client and installed into the computer in an unencrypted form. In another example, for DVD's (Digital Video Disk or Digital Versatile Disk) there is an encryption format embedded into the disk which is decrypted by the DVD player. The unencrypted signal is then conveyed to playback or recording devices.

All of these systems allow for the transmission channel or media to be secure. Unauthorized users receiving broadcasts of cable or satellite television programs or intercepting communications on the Internet, are frustrated by the encryption that is maintained over the radio or wired link. However in all of these systems, once the signal has been received and decrypted, it is in the clear and freely available for copying, reproduction and distribution.

The second portion of the vulnerability is the use of the content after receipt by the end customer. Several different efforts are aimed at protecting against unauthorized reproduction and distribution of copyrighted content after it has been obtained by a user or consumer. CPRM (Content Protection for Recordable Media) was jointly developed by Toshiba, Intel, IBM and Matsushita to allow consumers to store and replay the extensive range of music content that is becoming available through electronic music distribution platforms. CPRM allows music to be recorded on a portable music player, such as an MP3 player, but prevents the unauthorized reproduction and distribution of the music. HDCP (High-Bandwidth Digital Content Protection) developed by Intel protects digital content as it is transmitted between a set-top box or player to a display or playback or recording device. Like CPRM, HDCP allows a user to enjoy and use the encrypted content, but prevents unauthorized reproduction and distribution. DTCP (Digital Transmission Content Protection) developed by a consortium of hardware manufacturers allows a broadcaster to include a copy control code in any media to control the number and types of copies that can be made to the content. It uses a public key encryption scheme.

In any combination of these systems, the content is decrypted at some point in the distribution chain and at that point becomes vulnerable to unauthorized reproduction and distribution. If the set-top box, which receives the media, is a flexible software driven box such as a personal computer, then the software which performs the decryption as well as the content of the media, may be accessible to users that attempt to produce unauthorized copies. This leaves the content vulnerable, notwithstanding the various efforts that have been applied to encrypt and protect it.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention can improve the security of content protection mechanisms for broadcast and publicly available media. It can limit the ability to decrypt publicly available or broadcasted content to a single, economical, defensible, and trusted module. Subsequent less trusted processing can be done on a localized copy that permits tracing and, as a result, revocation of compromised devices. The less trusted processing allows distribution of the localized content without putting a global secret key at risk. Accordingly, there can be a secure offering environment at the broadcaster or manufacturer in which content is encrypted prior to its distribution. A separate secure server can manage the distribution of secret keys and thereby the content to users. A set-top box or other consumer electronics device can receive the keys from the secure server and transform the encrypted broadcast or publicly available content, to a locally encrypted content using an encryption and decryption module. A set of secure sinks decrypt and render this content into an analog form for human consumption.

Figure 1:
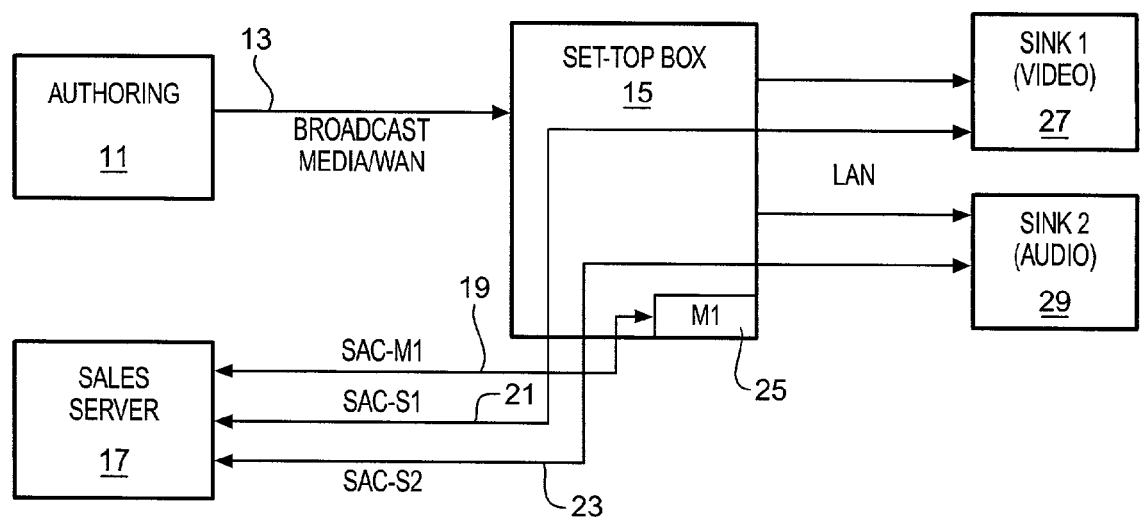
FIG. 1 is a block diagram of an entertainment system network suitable for implementing the present invention.

According to FIG. 1, the authoring environment 11 is typically located at any distributor or provider of desired content. This authoring environment produces encrypted content for distribution. This can be through a broadcast medium 13 such as a television cable system, a direct broadcast satellite system, a radio digital television system or it can be through a wide area network including the Internet. Content can include movies, television programs, special entertainment programs, sporting events coverage, music, games, software or images. The particular type of content whether it be a feature film, a sporting event, instructional training, office productivity software, interactive games or any other content is not important to the present invention. The invention is simplified however when this information can be distributed digitally.

In an alternate embodiment, the information is not broadcast over the link 13, but instead is recorded onto disks or tapes such as CD, (Compact Disk) DVD (Digital Versatile Disk), DAT (Digital Audio Tape) D-VHS (Digital Video Home System) or any other type of optical, magnetic or other data recording systems. For example, the content can be encoded onto DVD's and distributed through retail channels or the mails.

The media is sent or transferred from the authoring site 11, to a local set-top box 15. The set-top box can be a cable television receiver, a direct broadcast satellite receiver, a DVD format player or any kind of computing device including a micro-computer or a personal computer, capable of receiving the content over the medium whether broadcast or publicly available.

A sales server 17 communicates with the set-top box 15 over one or more SAC's (Secure Authenticated Channels). The SAC's may be telephone lines, Internet connections, secured connections over a coaxial cable television broadcast system or even secured broadcast channels through satellites or other radio interfaces.

The sales server can be a conventional computer server, adapted for communications over the Internet, PSTN (Public Switched Telephone Network) or other network. Alternatively, any other mechanism for providing keys over the media discussed above can be used, for example cable head-end or satellite downlink center. The first SAC 19, connects through the set-top box 15 to a secure defensible trusted module 25. In one embodiment, this module uses an ASIC (Application Specific Integrated Circuit) that is configured specifically to perform the encryption and re-encryption steps discussed herein. In another embodiment, a removable, programmable smart card, with tamper resistant hardware designed to safeguard the keys in the event of physical attack as well as timing and power analysis attacks can be used. In another embodiment, the module can be included as part of a larger integrated circuit. In this case, the circuit can contain the computational ability to perform the public key authentication and key agreement to set up the SAC, as well as the encryption and decryption operations. The trusted module preserves the long-time secret private key (in a public key cryptosystem) used for authentication, as well as shorter-lived secrets such as the keys used for encrypting the SAC, the broadcast media decryption key and state, and the sink device encryption key and state. Accordingly, it is very difficult to analyze and users or consumers are frustrated in trying to reverse engineer the encryption algorithms and discover any keys in the module.

The trusted module 25 communicates with the sales server using common symmetric encryption keys established by key agreement algorithms. The set-top box does not need to be trusted as its function is only to facilitate communication. In one embodiment, no keys are ever available to the set-top box except in an encrypted form. Module 25 receives a first key (K1) over its SAC. This key is used to decrypt the broadcast or publicly available media received from the authoring environment 11.

The key server also provides a second key (K2) over a second SAC 21 to a first sink 27 as well as to the trusted module 25. A third key (K3) is provided over a third SAC 23 to a second sink 29 as well as to the trusted module 25. The trusted module performs encryption and decryption using the keys. This can either be done completely within the module or a cipher stream can be generated by the module which is applied to the content in the set-top box. In one embodiment, as explained below, this cipher stream performs decryption and encryption in one step.

The first and second sinks are used by the user or consumer to render the content received from the authoring site. This can include playback, recording or both. In the embodiment of FIG. 1, the first sink is a video display such as a television screen. The second sink is an audio device such as an MP3 (Motion Pictures Expert Group's Audio Layer 3) player. The display screen can be a conventional television or a projector using CRT (Cathode Ray Tube), LCD (Liquid Crystal Display), light valve, gas discharge or any other type of display technology. The display can also include audio playback equipment. The audio sink can be a system of amplifiers and speakers, a music recording device such as an MP3 player or a variety of other different audio devices. The examples of sinks provided herein are intended as examples only. Any type of sink can be used to suit any particular application. In one embodiment, the set-top box handles the communication of the keys from the sales server to the sinks. This is done over a SAC so that the keys are not available in the set-top box. The encrypted messages are passed through the set-top box directly to the sinks which have systems configured to receive the keys, communicate with the set-top box to receive the messages from the key server 17 and configure themselves to decrypt any incoming entertainment content. Alternatively, the sinks can obtain the keys directly without intervention from the set-top box.

Figure 2:
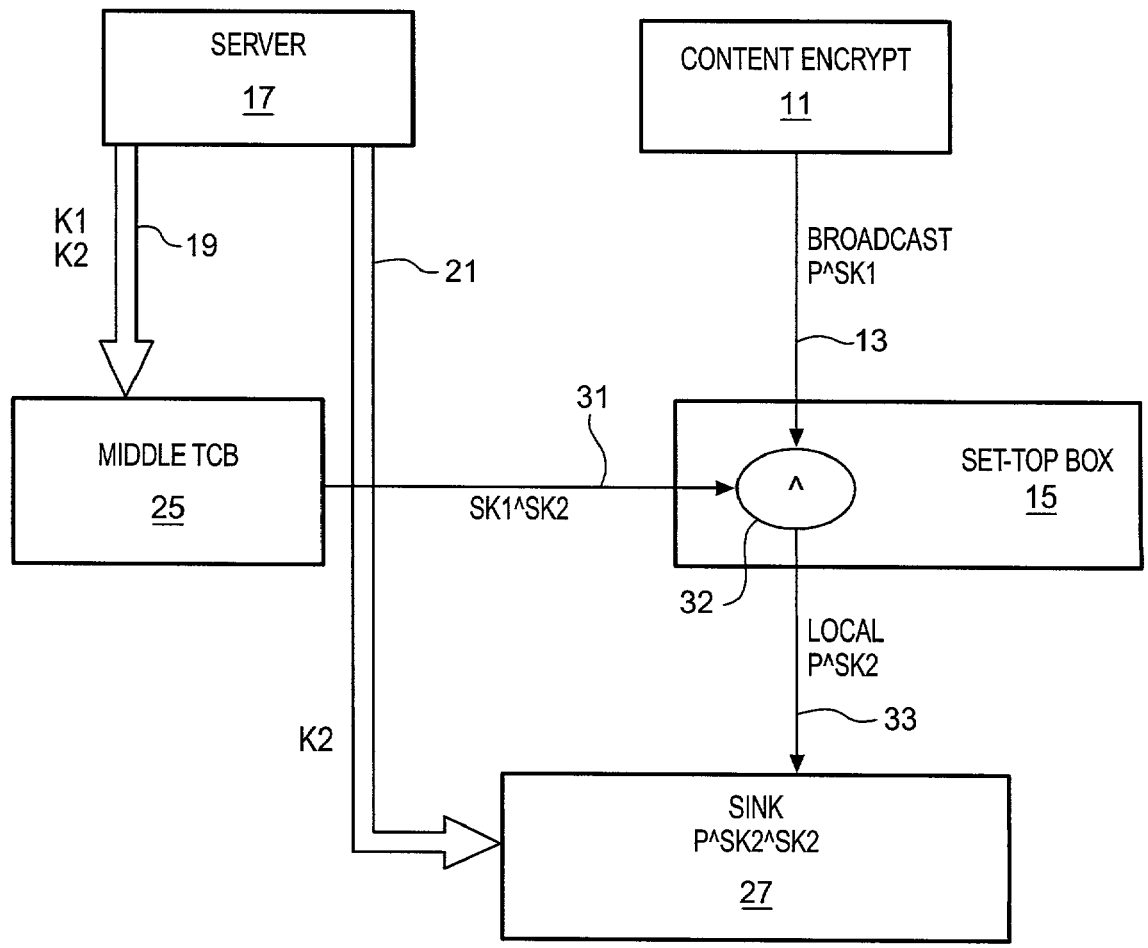
FIG. 2 is a block diagram showing a flow of encryption and decryption keys which may be implemented by the system of FIG. 1.

The distribution of keys from the key or sales server 17 according to one embodiment of the present invention, is shown in FIG. 2. The key server 17 provides keys to a middle TCB (Trusted Computing Base) 25 over the first SAC 19. The second SAC 21 is shown as providing keys to the first sink 27. Only the second key is provided to this sink. With keys in place, the content is broadcast or provided from an authoring source or a content player such as a DVD player 11 and sent over the broadcast channel 13 or a patch cable to the set-top box 15. In one embodiment, it arrives at the encrypted set-top box as an encrypted stream. A cipher stream 31 emanating from the TCB is combined with the content stream over medium 13 at an X-OR (exclusive or) combiner 32. The product of this is a decrypted and re-encrypted version of the streaming content which is passed on a local line 33 to the sink. The re-encrypted content is encrypted with the less secure local key (K2) and is rendered by the sink using only a cipher stream generated from the local key (K2).

In an alternate embodiment, the server can use the SAC to the trusted module 25 to convey the keys to the sink devices through the set-top box, as shown in FIG. 1. As shown in FIG. 2, the trusted module can produce a cipher stream output using the two keys that transforms the broadcasted content to a locally encrypted version. This can be done simply by combining the cipher stream with the content stream in an X-OR operation. The resulting localized content is further processed in the usual manner at the sink devices which can decrypt the content using the key that was agreed upon with the server 17 and produce clear analog outputs for human consumption. The cipher keystream is produced using conventional stream cipher algorithms taking a small key and producing a one time pad such as Wider Wake (available from PictureTel Corp.), RC-4 (available from RSA Security, Inc.), and SEAL (Software Optimized Encryption Algorithm available from IBM Corp.).

In the process, as shown in FIG. 2, the content is never decrypted until it reaches the sinks. There are some systems that use ciphers or encryption which cannot be easily be combined to create a clean cipher stream that encrypts and decrypts at the same time. DES (Data Encryption Standard originally developed by IBM Corp.) and AES (Advanced Encryption Standard) are examples of common block ciphers which do not have a final XOR operation to encrypt and decrypt. This makes simultaneous decryption and re-encryption more difficult. The trusted module can decrypt the content stream and then re-encrypt it using the incompatible encryption system of the sinks. In either case, the content is not available in a decrypted form in the set-top box or in any local subsequent processing.

Because the trusted module can be provided in a secure package or format, attackers must break the trusted module to be able to distribute the secret key that is used to generate the cipher-stream that can decrypt the broadcasted or publicly available content. An attack on the less expensive and less secure sinks would only produce a key to decrypt the localized copy. This does not provide access to the broadcasted or publicly available content. Accordingly, to further reproduce and distribute the broadcasted content, this content must be redistributed by the attacker. The existing distribution infrastructure cannot be used to provide unauthorized distribution or copying.

Providing a cipher key K1 for decrypting the broadcasted content and a different cipher key K2 for encrypting and decrypting the local content together with stream ciphers allows the encryption keys to be changed during the coarse of a broadcast. This allows one to enhance the security of an encrypted stream if the content is broadcast or distributed over a long period of time. In one embodiment, the trusted module generates both the cipher stream used to decrypt the broadcast content using K1 and the local encryption stream using K2 internally. It outputs only the X-OR product of the two streams. This stream is applied in an insecure environment to transform the broadcasted encrypted stream to a locally encrypted stream that can be understood by the sink devices.

Figure 3:
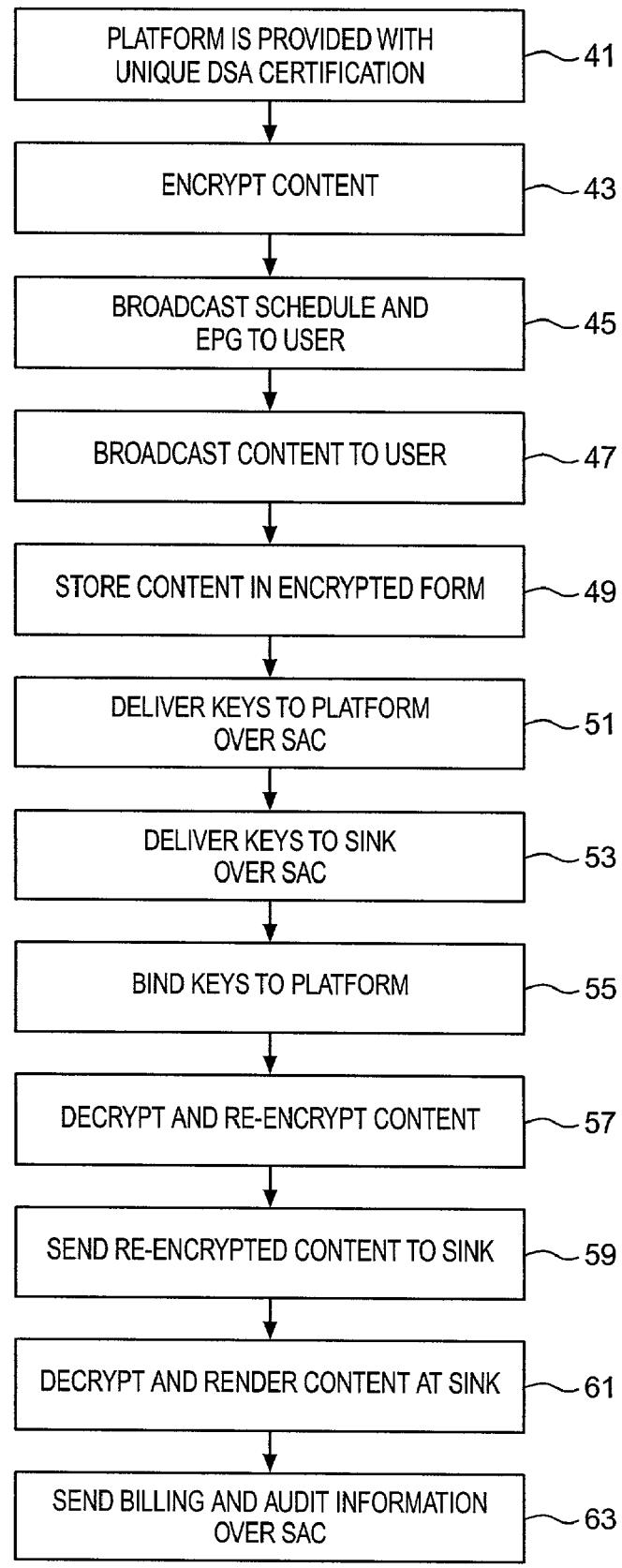
FIG. 3 is a process chart showing a sequence of steps for implementing an embodiment of the present invention.

Referring to FIG. 3, the process for receiving encrypted content and providing it in a secure way to a sink is shown. First, the platform such as a set-top box or a micro-computer 15 is supplied or fitted with a unique transcryption module 25 and might include, for example, a DSA (Digital Signature Algorithm) signed certificate 41. The content is then encrypted 43 at an authoring site. This encryption can be done in a number of different types of ciphers such as the stream ciphers discussed above. In a broadcasting context, metadata and scheduling information such as an EPG (Electronic Programming Guide) are broadcasted to the various set-top boxes 45 using satellite, cable, wireless or network communications links. Then the content is broadcasted 47 in an encrypted form to users. This encrypted content can be stored 49 on a hard disk drive, a digital video storage device or any other suitable storage medium. Alternatively, it can be buffered, then immediately decrypted, re-encrypted and conveyed to the sinks.

The keys are then delivered 51 to the set-top box using SAC's. The keys are also delivered 53 to sinks over SAC's. As mentioned above, this can be done either through a set-top box and the middle TCB or it can be done directly to the sinks using a communication protocol understood by the sinks. The keys are bound to the platform 55. This is done both at the trusted module and also at the sinks. After receiving the keys and having them bound, the encrypted content can be decrypted and re-encrypted 57 at the trusted module. The re-encrypted content using the local key is then conveyed to the sinks 59. The sinks can then decrypt and render the content 61. In one embodiment, billing and audit information collected by the set-top box or by the sinks can be communicated over SAC's or another channel back to the server that manages the keys 63 or to another server. This server can be a sales server for pay-per-view, games, or software purchases. The ordering of the steps described above can be changed to suit particular applications. For example, the keys can be provided before the content is received, the content can be encrypted at any time before or during broadcast and the billing and audit information can be provided before any of the other steps.

The present invention can greatly enhance the security of content management systems. It allows a user entertainment system to use a small, cheap and robust component at the set-top box that preserves the security of the broadcast content. The downstream security using local keys may be made cheaper or less robust because it is working only with a localized copy of the encrypted content. This saves substantial effort and expense in the production and security mechanisms for the downstream components. In addition, ciphers can easily be changed by the sales server to allow great flexibility when working with legacy sinks and different cipher and encryption capabilities. Finally, the use of an online server to establish key agreement in a single session can be used to enforce pay-per-view rights, rights to make copies and rights for higher grade rendering of any video or audio content. Higher grade rendering might include higher definition or resolution video, greater dynamic range, different picture formats, more audio channels or special versions, such as director's editions, special editions and editions with different ratings. Since the key changes at each session, a previous local copy can be made obsolete so that the number of performances of the local copy can also be controlled and applied to an appropriate fee schedule.

The present invention is capable of several variations. As discussed above, the unique trusted module makes it possible to decrypt and re-encrypt a digital stream in one step using an exclusive-OR operation based on the two keys. As a result, the content is never in the clear, i.e. it is never present in a decrypted form. This greatly enhances the total security of the system. This aspect of the invention is a great benefit no matter where the keys come from or how they are provided, determined and distributed. So, for example, the broadcast content key can be provided with the content and the local key can be selected by a local component, such as the set-top box or the sink. While this approach is not as secure as using a sales server, the unique simultaneous decryption and re-encryption helps to compensate for some of the risk. Alternatively, in some encryption systems such as DTCP, the content is encrypted with a public key and the receiver such as the set-top box or disk player is equipped with a private key that can be used to decrypt the content. By simultaneously decrypting and re-encrypting using the private decryption key and a local encryption key, security is again enhanced. Accordingly, the simultaneous encryption and re-encryption using stream ciphers is useful separate and apart from how the keys and cipher streams are managed.

A second aspect of the invention is keeping all encryption functions in a separate secure module. Whether it is a separate chip, a separate section of a larger chip, or a separate component, such as a smart card, consolidating the keys and possible the authentication information in the trusted module 25, allows this information to be secured much better or for less cost than securing the entire system. In a personal computer environment, all of the interfaces and operations can be software driven, exposing them to attach, while the keys can be protected in a way that helps to ensure integrity of the system. Since the amount of information in the trusted module is small, the cost of protecting the information can be easily controlled. In a hardware implementation, the trusted module can be further secured from attack even if the rest of the hardware is not protected. The cipher streams can be generated by the trusted module for greater security and the encryption operations can be done by the module or by faster more general purpose processors as shown in FIG. 2.

A third aspect of the invention is the distribution and management of keys by the sales server. Even if combined cipher streams that simultaneously decrypt and re-encrypt are not used or if a unique trusted module is not used, the key management system described herein provides significant benefits. As shown in FIGS. 1 and 2, the keys for both broadcast encryption and local encryption can be provided to the local system over a secure authenticated channel separate and apart from the broadcast channel which supplies the content. Since the amount of data that needs to exchanged over the SAC is small, the information can be very well protected and a low bandwidth channel can be used. This allows all keys to be managed by a single server. It also helps to ensure that the keys are kept secure. Providing the SAC functionality with the trusted module, eases the implementation of the system. The sales server or key server 17 can use the SAC also to exchange billing information with the set-top box and to receive information about the activity of the sinks. Finally, for content that has already been downloaded to the set-top box, permissions can be modified through the sales server without any further broadcasts. So for example, if a movie had been received with a view-only license, the user can change the license to a recording license directly through a transaction with the sales server.

Figure 4:
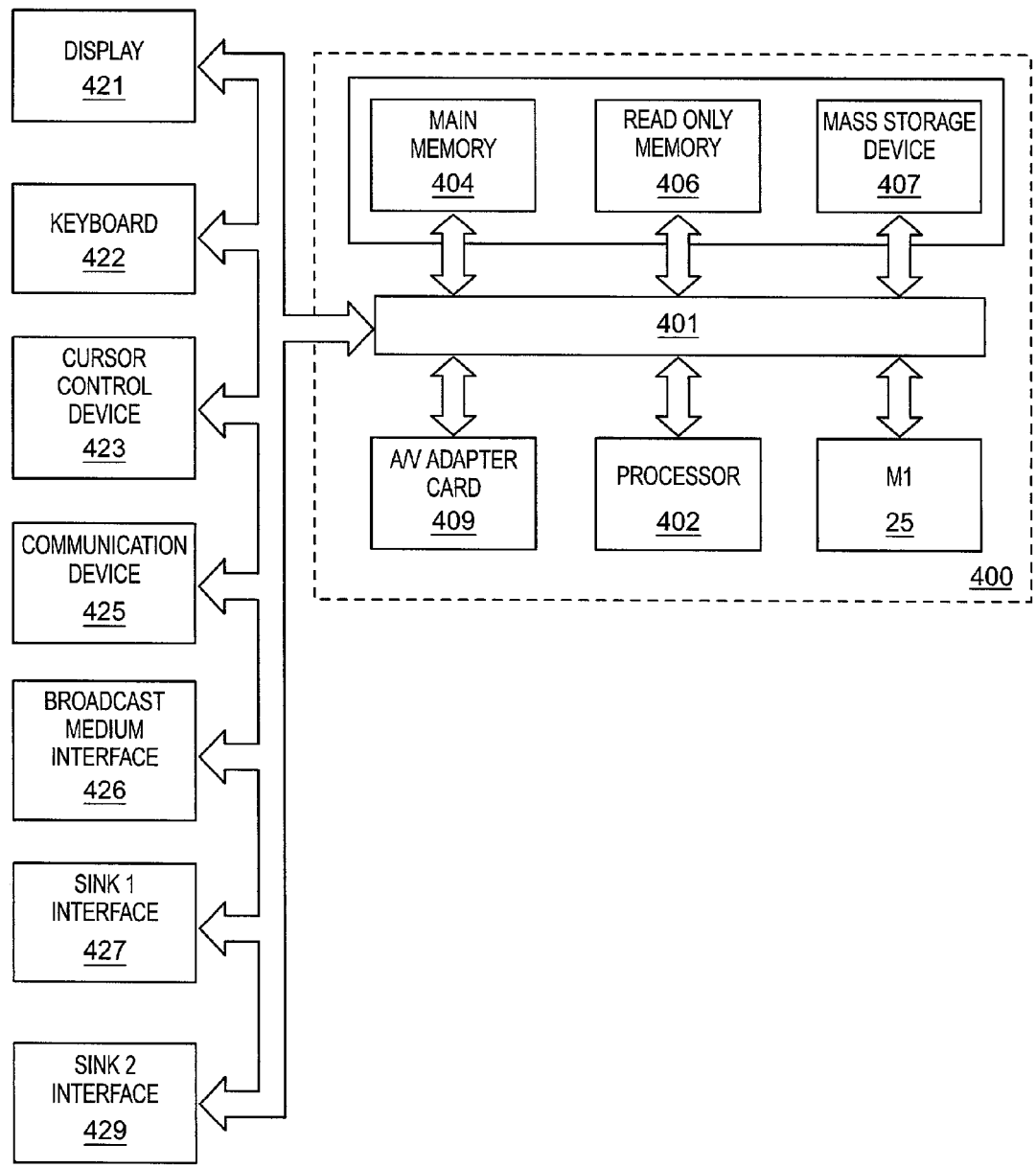
FIG. 4 is a block diagram showing one version of a set-top box suitable for use with present invention.

A computer system 400 representing an example of a system upon which the set-top box 15 of the present invention may be implemented is shown in FIG. 4. The set-top box 15 of FIG. 1 can also be configured similar to conventional cable, satellite or terrestrial airwave receivers. The computer system 400 includes a bus or other communication means 401 for communicating information, and a processing means such as a microprocessor 402 coupled with the bus 401 for processing information. The computer system 400 farther includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The computer system may also include a nonvolatile memory 406, such as a read only memory (ROM) or other static data storage device coupled to the bus for storing static information and instructions for the processor. A mass memory 407 such as a magnetic disk or optical disc and its corresponding drive may also be coupled to the bus of the computer system for storing information and instructions.

The computer system includes the trusted module 25 coupled to the bus that receives the keys and performs the decryption and encryption discussed above. The trusted module can be provided on the motherboard, on a separate card as shown, on a special adapter card with other video or audio functions or as an external unit. It can also be provided as a software module if the software content value is sufficiently low or the hardware environment is sufficiently robust, as in some high-end smartcards.

An audio/video adapter card is coupled to the bus as is well known in the art to receive broadcast or stored data on the bus and provide audio or video to external devices. It includes dedicated accelerators and coprocessors for A/V functions. For systems that do not support analog audio or video, the A/V adapter can be provided in software only.

The computer system can also be coupled via the bus to a display device or monitor 421, such as a cathode ray tube (CRT) or Liquid Crystal Display (LCD), for displaying information to a user. For example, graphical and textual indications of installation status, operations status and other information may be presented to the user on the display device. The display device can function as the video sink 27 or a separate display can be used. Typically, an alphanumeric input device 422, such as a keyboard with alphanumeric, function and other keys, may be coupled to the bus for communicating information and command selections to the processor. A cursor control input device 423, such as a mouse, a trackball, a wireless remote control or cursor direction keys can be coupled to the bus for communicating direction information and command selections to the processor and to control cursor movement on the display 421. In some embodiments, the keyboard and cursor control can be combined into a single remote control or wired input device.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. The SAC's can be provided through the communication device.

A broadcast medium interface 426 is coupled to the bus and receives broadcasts from any of the sources of content discussed above. This interface may be a coaxial cable demodulator, FM radio receiver, streaming Internet interface or any of a variety of other devices. The interface conveys the received content to the bus for decryption and rendering. Alternatively, the interface can be a digital disk or tape input interface that can be coupled to a digital tape or disk player.

Interfaces 427, 429 to the first and second sinks 27, 29 are also coupled to the bus to convey the locally encrypted content for recording or rendering to the consumer. These interfaces can be in a variety of forms to suit a variety of different signals depending on the requirements of the sinks. As mentioned above, output signals can include NTSC with Macrovision, USB (Universal Serial Bus) with CPRM or Firewire with HDCP among others.

It is to be appreciated that a lesser or more equipped computer system than the example described above may be preferred for certain implementations. Therefore, the configuration of the exemplary computer system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to distributing entertainment programming and software to consumers, the method and apparatus described herein are equally applicable to other multi-tier distribution of valuable content. In addition, while the invention has been described in terms of an internal trusted module 25, any other device that is readily manufacturable and that offers adequate security can be used. The module can be in hardware, firmware or software and can be integrated into a larger component such as a set-top box or provided as a stand-alone unit with appropriate interfaces.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
   receiving a first key for decryption of encrypted multimedia content over a secure authenticated channel from a sales server;
   receiving a second key for re-encrypting the encrypted multimedia content over a secure authenticated channel from the sales server;
   receiving the encrypted multimedia content;
   decrypting and re-encrypting the encrypted multimedia content using the first key and the second key;
   conveying the re-encrypted multimedia content to a sink; and
   sending audit information to the sales server over a secure authenticated channel.

2. The method of claim 1, further comprising conveying the second key to the sink to enable the sink to decrypt the re-encrypted content.

3. The method of claim 1, wherein receiving the encrypted content comprises receiving the encrypted content over a broadcast channel separate from any secure authenticated channel.

4. The method of claim 3, wherein the broadcast channel comprises at least one of direct satellite broadcast, terrestrial radio broadcast, cable television broadcast and Internet multicast.

5. The method of claim 1, wherein the secure authenticated channel comprises at least one of a telephone line, and an Internet connection.

6. The method of claim 1, wherein the secure authenticated channel is separate from the channel over which the encrypted multimedia content is received.

7. The method of claim 1, further comprising transmitting billing information to the sales server over a secure authenticated channel.

8. The method of claim 1, wherein decrypting and re-encrypting the encrypted content comprises combining the encrypted content as a stream with a cipher stream based on the first and second keys.

9. The method of claim 8, wherein the first key and the second key have symmetric agreement and wherein combining the encrypted content as a stream comprises exclusive OR-ing the encrypted content stream with an encryption stream.

10. The method of claim 8 wherein decrypting and re-encrypting the encrypted content comprises generating at least the cipher stream within a secure module.

11. The method of claim 1, wherein decrypting and re-encrypting the encrypted content comprises decrypting the encrypted content using the first key and re-encrypting the decrypted form of the encrypted content using the second key.

12. A machine-readable medium having stored thereon data representing sequences of instructions which, when executed by a machine, cause the machine to perform operations comprising:
   receiving a first key for decryption of encrypted multimedia content over a secure authenticated channel from a sales server;
   receiving a second key for re-encrypting the encrypted multimedia content over a secure authenticated channel from the sales server;
   receiving the encrypted multimedia content;
   decrypting and re-encrypting the encrypted multimedia content using the first key and the second key;
   conveying the re-encrypted multimedia content to a sink; and
   sending audit information to the sales server over a secure authenticated channel.

13. The medium of claim 12, further comprising instructions which, when executed by the machine, cause the machine to perform further operations comprising conveying the second key to the sink to enable the sink to decrypt the re-encrypted contents.

14. The medium of claim 12, wherein the instructions for receiving a key over a secure authenticated channel comprise instructions which, when executed by the machine, cause the machine to perform further operations comprising receiving the key from a sales server separate from receiving the multimedia content.

15. The medium of claim 14, further comprising instructions which, when executed by the machine, cause the machine to perform further operations comprising transmitting billing information to the sales server over the secure authenticated channel.

16. The medium of claim 12, wherein the first key and the second key have symmetric agreement and wherein the instructions for combining the encrypted content as a stream comprise instructions which, when executed by the machine, cause the machine to perform further operations comprising exclusive OR-ing the encrypted content stream with an encryption stream.

17. An apparatus comprising:
a secure authenticated channel interface to receive a first key from a sales server for decrypting encrypted multimedia content and a second key from the sales server to re-encrypt the multimedia content, and to send audit information to the sales server;
a content interface to receive the encrypted multimedia content; and
a computing device to re-encrypt the multimedia content using the first key and the second key and to convey the re-encrypted multimedia content to a sink.

18. The apparatus of claim 17, wherein the computing device comprises a secure module for holding the keys.

19. The apparatus of claim 18, wherein the computing device comprises a set-top box containing the secure module.

20. The apparatus of claim 18, wherein the secure module generates cipher streams for use by the computing device to decrypt and re-encrypt the encrypted content.

21. The apparatus of claim 17, wherein the computing device conveys the second key to the sink to enable the sink to decrypt the re-encrypted content.

22. An apparatus comprising:
a sales server to send a first key for encrypted multimedia content and a second key for re-encrypting the multimedia content over a secure authenticated channel to a subscriber, and to receive audit information from the subscriber over the secure authenticated channel;
an authoring server to send the encrypted multimedia content over a second channel to the subscriber;
wherein the subscriber can decrypt and re-encrypt the sent encrypted multimedia content using the first key and the second keys and then render the content using a sink device to decrypt the re-encrypted multimedia content.

23. The apparatus of claim 22, wherein the sales server communicates billing information with the subscriber using the secure authenticated channel.

24. The apparatus of claim 22, wherein the second channel is an entertainment broadcasting channel.

* * * * *

UNITED STATES PATENT AND TRADEMARK OFFICE
CERTIFICATE OF CORRECTION

PATENT NO. : 6,985,591 B2 Page 1 of 1
APPLICATION NO. : 09/896613
DATED : January 10, 2006
INVENTOR(S) : Graunke It is certified that error appears in the above-identified patent and that said Letters Patent is hereby corrected as shown below:

In column 7, at line 40, delete "farther" and insert --further--.

Signed and Sealed this

Fourth Day of December, 2007

JON W. DUDAS
*Director of the United States Patent and Trademark Office*